United States Patent Office 3,814,685
Patented June 4, 1974

3,814,685
REMOVAL OF MERCURY FROM MERCURY CATHODE SLUDGE
Donald G. Rachor and Richard A. Perry, Bellingham, Wash., assignors to the United States of America as represented by the Administrator of the United States Environmental Protection Agency
No Drawing. Filed Apr. 27, 1973, Ser. No. 354,983
Int. Cl. C02b 1/18; C01d 1/16
U.S. Cl. 210—59                         10 Claims

ABSTRACT OF THE DISCLOSURE

Mercury is recovered from mercury cathode sludge by treating the sludge with acid and then roasting. The mercury content of the residue is reduced significantly lower than when the acid treatment step is omitted.

BACKGROUND OF THE INVENTION

1. Field of the invention

The industrial hygiene problems associated with mercury vapor, and both inorganic and organic mercury compounds have long been recognized and safeguards have been developed to avoid harmful exposures. The situation changed dramatically with the publication in 1968 of the biological conversion of inorganic mercury to methyl mercury and similar compounds. The toxicity, persistence, and concentration of methyl mercury in food chains caused concern for any discharge of mercury into the environment.

Extensive analyses in North America indicated high mercury levels in fish and sediments associated with certain mercury-cell chlor-alkali facilities. All facilities in North America rapidly took steps to reduce total mercury discharges to less than 0.5 pounds per day to the receiving waters at each installation. In most instances, this involved stockpiling of mercury-containing materials such as process sludges.

2. Description of the prior art

Previous methods for removal of mercury from cathode sludge involved ion exchange chemical treatment and roasting. U.S. Pat. 3,536,597 shows an ion exchange process, which in practice is too expensive and complex for extensive commercial use. Chemical processes involving sodium hypochlorite leaching, or a modification thereof involving the generation of chlorine in situ by electrolysis of sodium chloride, have been employed. Although the mercury content of the sludge is considerably reduced by such treatment, the amount of mercury remaining is still too large from an ecological standpoint. Roasting the sludge, a process analogous to that employed since ancient times for separating mercury from other materials, likewise reduces the mercury content of the sludge. However, the mercury remaining in the residue is too large.

SUMMARY OF THE INVENTION

We have found that the mercury content of mercury cathode sludge can be reduced to very low concentrations by treating the sludge with acid, dewatering and then roasting. In the roasting step, the mercury driven off is recovered by condensation. The sludge residue has a mercury content of 0.10 p.p.m. or less. Since this is within the order of magnitude of the mercury content of naturally occurring soils, the sludge can be safely disposed of in a landfill.

It is an object of this invention to reduce the mercury content of brine process sludge and other mercury-containing solids to a level sufficiently low that the solids may be disposed of in landfills without significant hazard to the environment.

A further object is the recovery of mercury without significant loss into the atmosphere.

DESCRIPTION OF THE PREFERRED EMBODIMENTS

Our invention involves the discovery that when the sludge is pretreated with an acid, such as hydrochloric or sulfuric for example, prior to roasting, the final retorted residue will contain less mercury than when the sludge is roasted without the prior acid treatment. For example, by treating the sludge with hydrochloric acid, a reduction in the total sludge volume of from 60 to 75% is obtained and upon roasting the acid treated residue, the mercury content is reduced to a concentration of around 0.03 to 0.10 parts per million. Without the acid treatment, the roasted residue will contain mercury at concentrations greater than 1 part per million. Generally, the retorted sludge of sulfuric acid treated sludge will contain somewhat less mercury than the hydrochloric acid treated sludge. However, with sulfuric acid treatment, a reduction in the sludge volume of only about 10% or so is obtained.

The process involves treating or slurrying the sludge obtained from a mercury cathode electrolytic cell with a sufficient amount of acid to obtain a desired pH, dewatering the mixture, and heating the residue at a temperature of from 1100–1500° F. Preferably, the acid treated sludge is heated at a temperature of around 1200–1400° F. While at the higher temperature a more rapid distillation or vaporization of the mercury may be obtained, the temperature may be sufficiently high to melt some of the salts in the residue resulting in fusing the residue or the formation of hard clinkers.

Since the residues obtained contain mercury concentrations close to the natural mercury concentration found in soils, the residue disposal problem is considerably simplified. The aqueous effluent obtained from dewatering of the acid treated sludge contains dissolved mercury which can be recovered by usual known methods for recovery of mercury ions from solution, such as by sulfide precipitation. A major portion of the mercury is dissolved from the sludge with hydrochloric acid treatment. However, with the sulfuric acid treatment, the amount dissolved is less.

The following examples illustrate the invention:

A mercury cathode electrolytic sludge, on oven-dried basis, contained 822 parts of mercury per million parts of sludge. The wet sludge as obtained from the treatment of the brine was used. A series of samples of the sludge was acidified to different pH's and allowed to stand at room temperature with periodic stirring. The mixture was then dewatered by filtration and the resulting filter cake obtained was then heated in a crucible kiln for about 8 hours. The filtrate obtained and the retorted residue was then analyzed to determine the amount of mercury dissolved in the filtrate, the amount remaining in the filter cake after acid treatment and the amount remaining after the filter cake or residue was heated in the kiln.

The above runs were compared to a run where the sludge, as obtained, was filtered without acid treatment, dewatered by filtration, and then heated in a manner similar to that used for the acid treated residue. The details and the results obtained are shown in the following Table.

TABLE I

| Run | Acid treatment — Acid used | Amt. add, ml./g. of solids | pH | Temp. | Time, hrs. | Filtrate after acid treat — Hg content, p.p.m. | Filtrate after acid treat — Percent of total Hg | Solids or filter cake after acid treat — Hg content, p.p.m. | Solids or filter cake after acid treat — Percent of total Hg | Retorted residue — Amt. of solids, percent of original | Retorted residue — Amt. of residue, percent of original | Retorted residue — Hg content, p.p.m. | Temp. heating, °F. |
|---|---|---|---|---|---|---|---|---|---|---|---|---|---|
| 1 | HCl | .73 | 2 | Room temp | 3–4 | 117 | 75 | 634 | 25.0 | 33.9 | 26 | .03 | 1,400 |
| 2 | HCl | 1.50 | 0 | 140° C | 40 | 195 | 94.8 | 120 | 5.2 | 35.4 | 27 | .06 | 1,400 |
| 3 | $H_2SO_4$ | .21 | 6.4 | Room temp | 4 | 435 | 37 | 586 | 63 | 91.6 | 81 | 0.06 | 1,350 |
| 4 | $H_2SO_4$ | .25 | 5.5 | do | 3 | 380 | 49 | 379 | 51 | 94.8 | 80 | 0.02 | 1,350 |
| 5 | $H_2SO_4$ | .29 | 0 | do | 3 | 530 | 63 | 418 | 37 | 99.5 | 84 | 0.01 | 1,350 |
| 6 | $H_2SO_4$ | .51 | 0 | do | 4 | 530 | 50 | 503 | 50 | 91.8 | 84 | 0.05 | 1,350 |
| 7 | $H_2SO_4$ | .42 | 0 | do | 4 | 535 | 53 | 564 | 47 | 100.0 | 95 | 0.10 | 1,350 |
| 8 | No acid treatment | | | | | | | | | | 72 | 1.00 | 1,400 |
| 9 | do | | | | | | | | | | | 2.00 | 1,325 |

In treatment with sulfuric acid, the sludge is generally treated with sufficient amount of acid such that the aqueous phase of the solution is at a pH below 6.5. Preferably it is desirable to use sufficient amount of acid to have a pH of from about 3 to pH approaching 0. Addition of more sulfuric acid after the slurry has reached a pH approaching 0 does not have any apparent beneficial effect and is a disadvantage in that the amount of solids obtained is not decreased but may be increased. Apparently the use of excess sulfuric acid results in the formation of insoluble sulfate salts which increase the total amount of solids. With hydrochloric acid, generally a pH of below 3 can be used with a pH in a range of 2 to 0 being preferred.

In the dewatering step, filtration, centrifugation or other means may be used.

While the Examples show hydrochloric and sulfuric acids capable of reacting with the sludge, other acids may be employed, such as acetic, hydrobromic, hydroiodic, chlorous, phosphoric, sulfurous, selenic, carbonic, etc. Nitric acid, however, would be less suitable since it dissolves mercury very readily and would place the bulk of both the mercury and the other sludge solids in solution. In general, sufficient acid is added to bring the pH down to a range of about 3 to approaching 0. A strong acid will usually be employed to bring down the pH of the sludge since the latter is highly buffered by the presence of carbonates. Considerations of cost and availability will generally dictate the use of hydrochloric or sulfuric acids. About 500 to 1000 pounds of concentrated hydrochloric or sulfuric acids are needed per ton of sludge.

What is claimed:

1. A method of treating mercury cathode sludge to reduce the mercury content thereof comprising:
    (a) adding sufficient acid to the sludge to form a slurry and to bring the pH to a range of from about 6.5 to approaching 0;
    (b) digesting the acidified slurry;
    (c) separating an aqueous liquid from solids in the digested slurry;
    (d) separating mercury from the aqueous liquid of step (c);
    (e) roasting the solids from step (c) at a temperature of about 1100° F. to about 1500° F. to drive off mercury containing vapor and to produce a sludge residue;
    (f) separating mercury from said vapor; and
    (g) recovering the sludge residue having a depleted mercury content which may be disposed of without causing ecological damage.

2. The method of claim 1 wherein the acid is sulfuric.

3. The method of claim 1 wherein the acid is hydrochloric.

4. The method of claim 1 wherein the roasting temperature is from about 1200° F. to 1400° F.

5. The method of claim 3 wherein the pH range is about 2 to approaching 0.

6. The method of claim 1 wherein the liquid is separated from the slurry by centrifugation.

7. The method of claim 1 wherein the liquid is separated from the slurry by filtration.

8. The method of claim 2 wherein the roasting temperature is from about 1200° F. to 1400° F.

9. The method of claim 5 wherein the roasting temperature is from about 1200° F. to 1400° F.

10. The method of claim 3 wherein the roasting temperature is from about 1200° F. to 1400° F.

References Cited

UNITED STATES PATENTS

| | | | |
|---|---|---|---|
| 3,536,597 | 10/1970 | Yamori et al. | 204—99 |
| 3,755,110 | 8/1973 | Wygasch et al. | 204—99 |
| 3,649,534 | 3/1972 | Schotte | 210—71 X |
| 3,720,609 | 3/1973 | Smith et al. | 210—59 |

FOREIGN PATENTS

| | | | |
|---|---|---|---|
| 772,226 | 4/1957 | Great Britain | 204—99 |

THOMAS G. WYSE, Primary Examiner

U.S. Cl. X.R.

210—71; 204—99